(12) United States Patent
Yamazaki et al.

(10) Patent No.: US 7,787,120 B2
(45) Date of Patent: Aug. 31, 2010

(54) SPECTROPHOTOMETER AND LIQUID CHROMATOGRAPHY SYSTEM

(75) Inventors: Motohiro Yamazaki, Mito (JP); Ryoji Inaba, Hitachinaka (JP); Kosaku Toyosaki, Ishioka (JP); Shintaro Kubo, Hitachinaka (JP); Takashi Gomi, Hitachinaka (JP); Katsunobu Hama, Hitachinaka (JP); Kiyotoshi Mori, Hitachinaka (JP); Hideyuki Akiyama, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 147 days.

(21) Appl. No.: 12/146,920

(22) Filed: Jun. 26, 2008

(65) Prior Publication Data
US 2009/0009761 A1    Jan. 8, 2009

(30) Foreign Application Priority Data
Jun. 28, 2007    (JP)    ............................. 2007-170698

(51) Int. Cl.
G01J 3/10 (2006.01)
G01J 3/36 (2006.01)
G01N 21/33 (2006.01)
(52) U.S. Cl. .................... 356/326; 356/51; 356/328; 250/373
(58) Field of Classification Search ............. 356/51, 356/72, 326, 328
See application file for complete search history.

(56) References Cited

U.S. PATENT DOCUMENTS 6,307,204 B1 * 10/2001 Kanomata et al. ........... 250/373

7,154,607 B2   12/2006 Hendrix et al.

FOREIGN PATENT DOCUMENTS

| JP | 63-182530 | 7/1988 |
|---|---|---|
| JP | 03-035129 | 2/1991 |
| JP | 04-086534 | 3/1992 |
| JP | 8-233659 | 9/1996 |
| JP | 10-153705 | 6/1998 |
| JP | 2003-185498 | 7/2003 |
| JP | 2005-321245 | 11/2005 |

OTHER PUBLICATIONS

Japanese Office Action, w/ English translation of relevant portion, issued in Japanese Patent Application No. JP 2007-170698 dated Aug. 25, 2009.

* cited by examiner

Primary Examiner—F. L Evans
(74) Attorney, Agent, or Firm—McDermott Will & Emery LLP

(57) ABSTRACT

Detection sensitivity is improved by increasing the amount of light of beams that irradiate a sample cell without causing saturation of a detector with ultraviolet beams or visible beams. This spectrophotometer includes a sample cell, which stores a sample to be measured, a visible light source and an ultraviolet light source each for supplying an incident beam that enters the sample, a spectroscope, which disperses a beam that has passed through the sample, an optical detector, which detects beams dispersed from such beam (spectrum), and a dichroic element which reflects or transmits ultraviolet beams from the ultraviolet light source and which transmits or reflects visible beams from the visible light source. Optics are configured such that ultraviolet beams and visible beams that have passed through or have been reflected by the dichroic element enter the sample cell.

14 Claims, 6 Drawing Sheets

SPECTROPHOTOMETER AND LIQUID CHROMATOGRAPHY SYSTEM

BACKGROUND OF THE INVENTION

1. Field of the Invention

The present invention relates to spectrophotometers and liquid chromatography systems for measuring the absorbance of, for example, a trace substance in a solution.

2. Background Art

Conventional spectrophotometers are mainly composed of a light source, which generates beams that enter a sample, a sample cell, which stores a sample to be measured, and a spectroscope and an optical detector for detecting beams that have passed through the sample. The beams generated by the light source are allowed to enter the sample, which is stored in the sample cell, using light collection optical system.

Quantitative analysis of components of a sample can be carried out by extracting beams with an absorption wavelength that is peculiar to the sample from beams that have passed through the sample, using a spectroscope, and measuring the light transmittance of the sample with a photoelectric detector.

Lamps such as a deuterium lamp and a halogen lamp are used for the light source. A deuterium lamp emits beams mainly in the ultraviolet range (wavelengths of 115 to 440 nm) and emission lines in the visible range (486 nm and 656.1 nm). A halogen lamp emits beams mainly in the visible range (380 to 2400 nm). A spectrophotometer can measure a wide range of wavelengths including those in both the ultraviolet and visible ranges. Therefore, it is necessary to allow both beams from the deuterium lamp and the halogen lamp to enter a sample cell.

Conventionally, a half mirror has been used for aligning both the beams along the same axis. Ultraviolet beams and emission lines in the visible range emitted from the deuterium lamp are made to pass through the half mirror, whereas visible beams emitted from the halogen lamp are reflected by the half mirror. Such beams are coaxially aligned so that beams in the ultraviolet to visible ranges enter a sample cell.

In recent years, among liquid chromatography detectors, which are one type of spectrophotometer, three-dimensional detectors have been becoming the mainstream because the three-dimensional detectors can obtain absorption spectra in real time and are superior in qualitative analysis of samples. However, in comparison with conventional detectors, the three-dimensional detectors are inferior in sensitivity and, in particular, their output of measured data is susceptible to fluctuation of ambient temperature. This is because, since a three-dimensional detector concurrently measures beams in the measurement wavelength range (190 to 900 nm), sample irradiation time is short and sufficient signal strength cannot be obtained, which results in a low S/N ratio. In addition, since the three-dimensional detector must employ a single-beam measurement method due to the principle of measurement, it cannot compensate for fluctuation in the amount of light of beams emitted from a light source. This is unlike the case of conventional single-wavelength detectors that employ a double-beam measurement method. Thus, the fluctuation in the amount of light of beams emitted from the light source directly results in noise/drift of the output value. Therefore, in order to minimize the drift, optics that saturate a sample cell with light of beams are used. That is, optics that magnify the light-emission point of a light source are used to increase the diameter of an incident beam such that it becomes larger than the diameter of a sample cell window, so that durability against fluctuation of beams is increased. Meanwhile, since the amount of light of incident beams is reduced, noise is increased.

Further, in recent years, columns and liquid feed pumps for separating samples to be measured have been improved and high-speed processes have been advanced. This, in turn, has shortened detector sampling time, that is, sample irradiation time. Therefore, in order to obtain adequate sensitivity, it is required that beams of a sufficient amount of light enter the sample cell and that beams of a sufficient amount of light be detected with a detector.

Reference 1 (JP Patent Publication (Kokai) No. 8-233659 A (1996)) relates to a spectrophotometer in which a photodiode array is used as a light-receiving element. Upon measurement, two light sources, which are a deuterium lamp and a halogen lamp, are concurrently lit. Reference 1 discloses a structure in which a measurement beam obtained by mixing beams with an optical mixing element enters a sample in a flow cell. However, Reference 1 does not disclose what kind of element is used for the optical mixing element.

Reference 2 (U.S. Pat. No. 7,154,607 B) relates to a system of creating probe beams capable of uniform illumination across a wide range of wavelengths, in which a UV light source and a white light source are used and a diode or a diode array is used as an auxiliary light source. Visible and ultraviolet beams are mixed using a beam splitter or an optical fiber so that a sample is irradiated with the visible and ultraviolet beams.

Reference 3 (JP Patent Publication (Kokai) No. 2005-321245 A) and Reference 4 (JP Patent Publication (Kokai) No. 2003-185498 A) disclose an ultraviolet-visible, infrared, or fluorescent spectrophotometer, in which a diode array detector is used and reflected beams of a deuterium lamp and a halogen lamp are utilized.

SUMMARY OF THE INVENTION

The inventors have conducted concentrated studies and found that the following problems arise when a half mirror is used for a spectrophotometer with a three-dimensional detector.

In conventional spectrophotometers, beams emitted from two kinds of light sources, which are an ultraviolet light source and a visible light source, are allowed to enter a sample cell using a half mirror and a toroidal mirror. A half mirror transmits beams emitted from the ultraviolet light source but reflects beams emitted from the visible light source, and it aligns those beams along the same optical axis. Then, the beams are allowed to enter a sample cell by way of a toroidal mirror. In order to improve the detection sensitivity of such optics, a method has been adopted in which the amount of light is increased by increasing/decreasing the diameter of an incident beam emitted from a light source such that it becomes closer to the diameter of a sample cell window. That is, the magnification factor of the light-emission point relative to the diameter of the sample cell window is reduced or the amount of light of incident beams is increased using reduction optics and the like.

A deuterium lamp, which is typically used as an ultraviolet light source, produces emission lines (486 nm and 656.1 nm) in the visible range. In a case where an optical element like a half mirror, which has almost equal transmission properties or reflection properties with respect to light of all wavelengths, is used, and when the amount of light of ultraviolet beams is increased by changing the diameter of an incident beam from a light source, signals of emission lines also increase. Thus, there is a possibility that the emission lines could saturate a detector. Further, when the amount of light of beams from a visible light source is also increased, there is a possibility that emission lines could saturate the detector. Thus, the amount of light of visible beams around the emission lines can be reduced by installing a filter or the like, which cuts only emission lines, on the detector. However, when a filter that cuts beams in the visible range is used, the transmittance of beams in the ultraviolet range also decreases, resulting in a decrease in the amount of light of ultraviolet beams. In the case of using a three-dimensional detector of a conventional spectrophotometer, the positions of beams to be incident on the detector are known in advance. Thus, providing a cut filter in the position can be considered. However, this results in a reduction in the amount of light of beams around the emission lines, and thus, sensitivity is decreased.

Furthermore, when the reflectivity of a half mirror with respect to beams in the visible range is increased in order to increase the amount of light of visible beams, the transmittance of the half mirror with respect to beams in the ultraviolet range decreases. Thus, another problem arises in that the amount of light of ultraviolet beams decreases.

In the case of using a spectrophotometer such as a three-dimensional detector that employs a single-beam measurement method, it is important to increase the amount of light of beams that enter a sample cell in order to enhance the sensitivity of the photometer. However, it is quite difficult to increase the amount of light of incident beams with an inexpensive method.

It is an object of the present invention to increase the amount of light of beams that irradiate a sample cell and improve the detection sensitivity without causing saturation of a detector with ultraviolet beams or visible beams.

The present invention provides a spectrophotometer having a sample cell, which stores a sample to be measured, a visible light source and an ultraviolet light source each for supplying an incident beam that enters the sample, a spectroscope, which disperses a beam that has passed through the sample, an optical detector, which detects beams dispersed from such beam (spectrum), and a dichroic element, which reflects or transmits ultraviolet beams from the ultraviolet light source and which transmits or reflects visible beams from the visible light source. Optics are configured such that ultraviolet beams and visible beams that have passed through or have been reflected by the dichroic element enter the sample cell.

According to the present invention, the amount of light of ultraviolet beams can be increased while minimizing adverse effects of emission lines from an ultraviolet light source (for example, a deuterium lamp). In addition, since beams from a visible light source (for example, a halogen lamp) are made to pass through an optical element, the transmittance of the optical element can be easily changed and the amount of light of visible beams can thus be increased. Therefore, the amount of light of beams in the ultraviolet to visible ranges that enter a sample cell can be increased, and thus, a spectrophotometer with high sensitivity can be provided at low cost without using expensive optical elements that are specially designed.

DETAILED DESCRIPTION OF THE PREFERRED EMBODIMENTS

Figure 1:
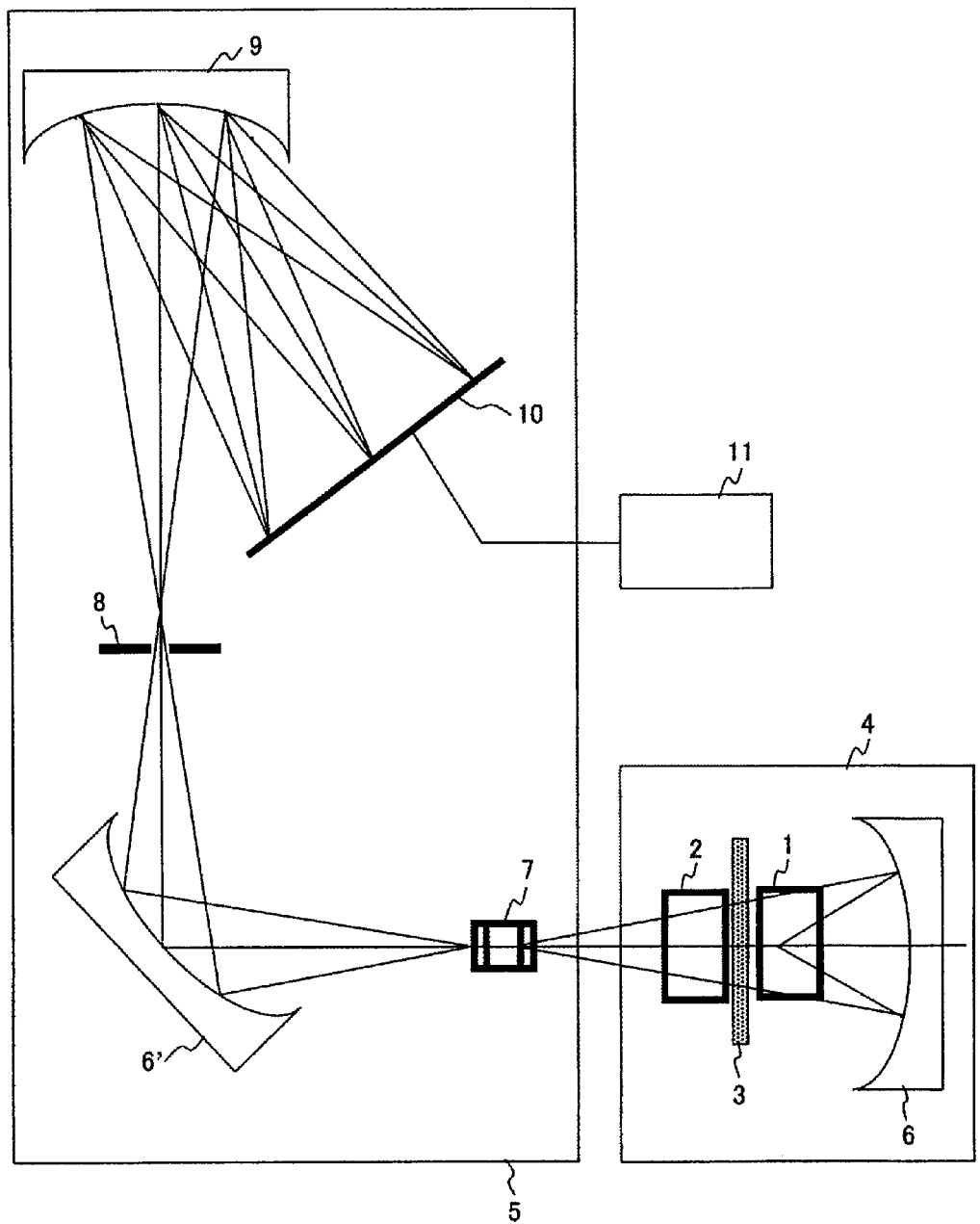
FIG. 1 illustrates the basic structure of a three-dimensional detector for liquid chromatography according to an embodiment of the present invention.

According to one aspect of the present invention, a spectrophotometer is provided in which optics are configured with an optical element (for example, a dichroic mirror), which transmits beams from a visible light source but reflects beams from an ultraviolet light source, so that the optics align both the beams along the same optical axis. A dichroic element used in the present invention has different reflection properties and different transmission properties with respect to ultraviolet beams and visible beams.

With the optical element such as a dichroic mirror described above, ultraviolet beams from the ultraviolet light source are reflected, whereas emission lines in the visible range from the ultraviolet light source are made to pass through the optical element or, even when reflected, reflected with a reflectivity of only several %, whereby it is possible for ultraviolet components alone to be separated and allowed to enter a sample cell. In addition, beams from the visible light source are made to pass through the dichroic element and are aligned along the optical axes of the ultraviolet beams so that both the beams enter the sample cell.

Preferred embodiments of the present invention will be described below.

The above-mentioned dichroic element is a dichroic mirror or a dichroic filter. The dichroic element preferably has a first film formed over one of its surfaces, which reflects ultraviolet beams incident on the element and transmits visible beams, and a second film formed over the other surface, which transmits visible beams. Alternatively, the dichroic element preferably has a first film formed over one of its surfaces, which reflects visible beams incident on the element, and a second film formed over the other surface, which transmits ultraviolet beams. As a further alternative, the dichroic element preferably has a metal film formed over one of its surfaces, which transmits visible beams incident on the element, and a dielectric multilayer film formed over the other surface, which reflects ultraviolet beams.

Optics can be configured such that ultraviolet beams that have been reflected by the dichroic element and visible beams that have passed through the dichroic element enter the sample cell.

Alternatively, optics can be configured such that ultraviolet beams that have passed through the dichroic element and visible beams that have been reflected by the dichroic element enter the sample cell.

In addition, optics can be configured such that incident beams are aligned along the same optical axis with the dichroic element, and visible components of the ultraviolet light source, which have been reflected, the ultraviolet beams, and the visible beams that have passed through the dichroic element enter the sample cell.

The reflectivity of the dichroic element with respect to visible components of the ultraviolet light source is variable. In addition, the transmittance of the dichroic element with respect to visible components of the visible light source is variable.

The present invention provides a spectrophotometer including a sample cell, which stores a sample to be measured, a light source section for supplying an incident beam that enters the sample, a spectroscope, which disperses a beam that has passed through the sample, an optical detector, which detects beams dispersed from such beam (spectrum), a dichroic element, an ultraviolet light source, and a visible light source. The dichroic element reflects or transmits ultraviolet beams from the ultraviolet light source and transmits or reflects visible beams from the visible light source. In such a spectrophotometer, optics are configured such that the beams from the ultraviolet light source are separated into ultraviolet components and visible components with the use of the dichroic element, and ultraviolet beams and visible beams that have passed through or have been reflected by the dichroic element are allowed to enter the sample cell.

Further, in the above spectrophotometer, the dichroic element has a first film formed over one of its surfaces, which reflects visible beams incident on the element, and a second film formed over the other surface, which transmits ultraviolet beams.

In the above spectrophotometer, a dichroic element, which reflects more than 50% and preferably more than 80% of ultraviolet beams from the ultraviolet light source, can be used to reflect ultraviolet beams. In addition, in the above spectrophotometer, a dichroic element, which reflects less than 50% and preferably less than 20% of visible components of the ultraviolet light source, can be used to reflect visible beams. The incident beams are preferably aligned along the same axis using a dichroic element, which transmits visible beams from the visible light source.

In the above spectrophotometer, a dichroic element, which transmits more than 50% and preferably more than 80% of ultraviolet beams from the ultraviolet light source and which transmits less than 50% and preferably less than 20% of visible beams, is preferably used to transmit ultraviolet beams. Further, the incident beams are aligned along the same axis with the use of the dichroic element, which reflects visible beams from the visible light source. According to the present invention, a liquid chromatography system having any of the above-mentioned spectrophotometers is provided.

The above and other novel features and advantageous effects of the present invention will be hereinafter described in detail by way of example, with reference to the accompanying drawings. It should be noted that the embodiments below and drawings are merely illustrative of the examples of the present invention and thus are not intended to limit the spirit and scope of the present invention.

Embodiment

FIG. 1 illustrates the structure of a three-dimensional detector for liquid chromatography.

The three-dimensional detector includes a flow cell 7, which is a sample cell for storing a sample to be measured, a light source chamber 4, which is a light source section for supplying incident beams to enter the sample, a grating 9, which is a spectroscope for dispersing beams that have passed through the sample, and a photodiode array detector 10, which is an optical detector for detecting beams dispersed from such beam (spectrum).

An ultraviolet light source 1, a visible light source 2, and a dichroic element (hereinafter also referred to as an optical element) 3 are stored in the light source chamber 4. Light source beams emitted from the ultraviolet light source 1 are reflected by the optical element 3 and then are allowed to enter the flow cell 7 using a converging mirror 6. Typically, a deuterium lamp is used for the ultraviolet light source 1 and a halogen lamp is used for the visible light source 2. Similarly, beams emitted from the visible light source 2 pass through the optical element 3 and then are allowed to enter the flow cell 7 using the converging mirror 6.

The beams that have passed through the flow cell are converged at a slit 8 using a converging mirror 6', and beams that have passed through the slit are dispersed by the grating 9. Beams dispersed from such beam (spectrum), which have different wavelengths, are concurrently measured with the photodiode array detector 10 having 500 to 1000 light-receiving elements. The measured data is processed with a computing section 11. Accordingly, it is possible to obtain the absorption spectrum of each component of a sample that has been separated by a separator of a liquid chromatography system. Further, not only can an unknown sample be analyzed qualitatively, but also the purity of each component can be known from shape anomaly of the absorption spectrum.

Figure 2A:
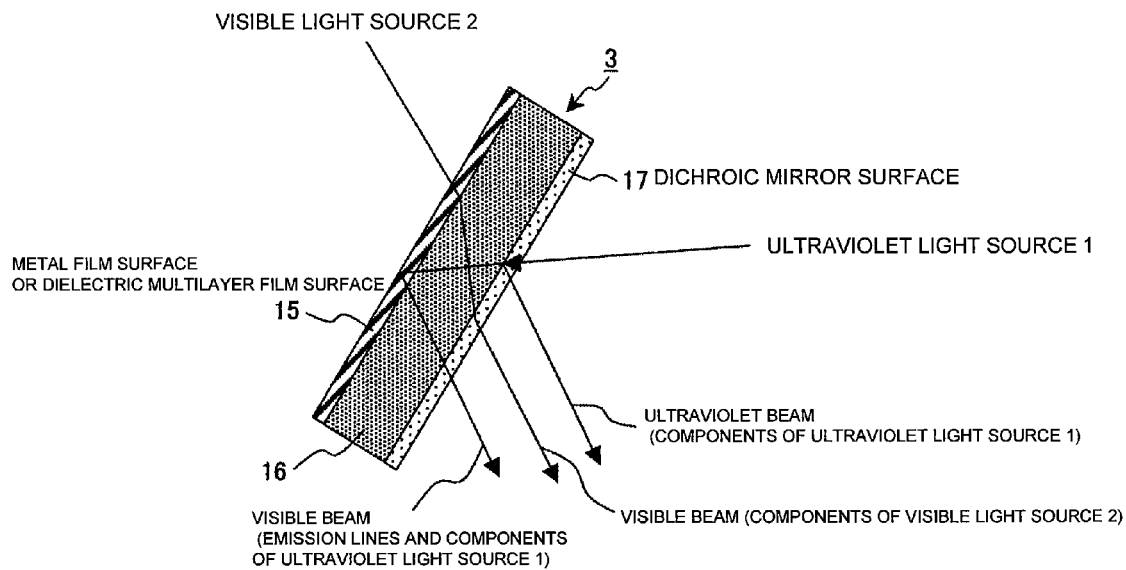
FIG. 2A is a schematic diagram illustrating the relationship between a light source section of a spectrophotometer and a dichroic element according to an embodiment of the present invention.
Figure 2B:
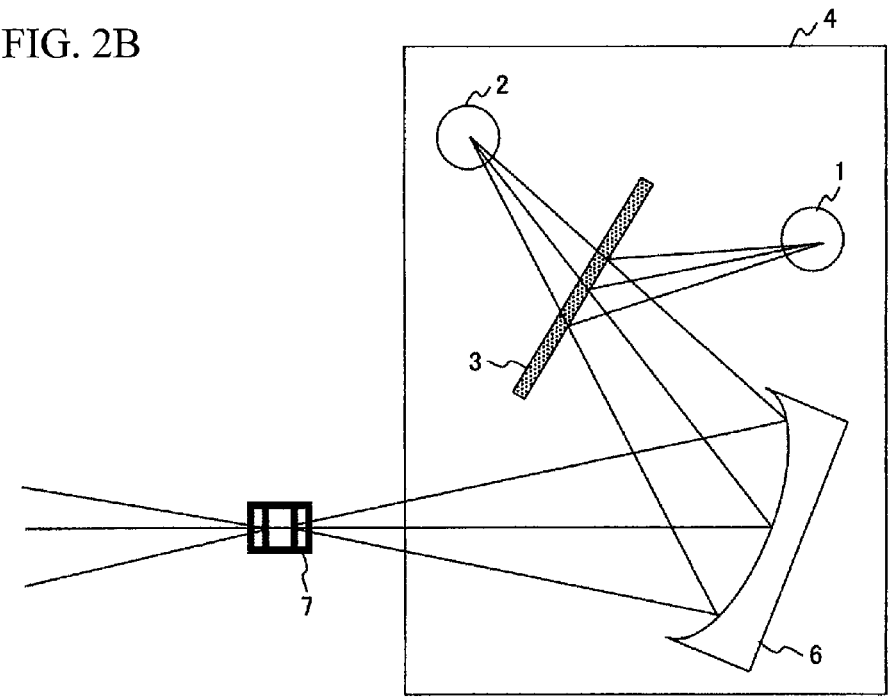
FIG. 2B is a schematic diagram of optics.

FIGS. 2A and 2B are schematic views of a light source section for liquid chromatography. FIG. 2A is a schematic cross-sectional view illustrating the structure of a dichroic element, and FIG. 2B is a schematic view of optics using the dichroic element. In FIG. 2A, the dichroic element 3 is formed by covering one surface of a transparent substrate 16 with a dielectric multilayer film or the like to form a dichroic mirror surface 17 and covering the other surface with a metal film or a dielectric multilayer film to form a mirror surface or transmissive surface 15. In FIG. 2A, the surface on the right side is the dichroic mirror surface, which reflects ultraviolet beams from the ultraviolet light source 1. Visible components of the ultraviolet light source 1 are reflected using a reflection surface on the left side. Meanwhile, beams from the visible light source 2 pass through the element so that the visible beams are extracted.

As illustrated in FIG. 2B, light source beams emitted from the ultraviolet light source 1, which is stored in the light source chamber 4, are reflected by the dichroic element 3, and they are then allowed to enter the flow cell 7 using the converging mirror 6. At this time, ultraviolet components of the ultraviolet light source 1 are reflected by the dichroic mirror surface of the optical element 3 with high reflectivity. A dichroic mirror has a characteristic of being capable of reflecting ultraviolet beams from an ultraviolet light source with higher reflectivity than it reflects visible beams. For example, it can reflect only ultraviolet beams (around 190 nm) with a reflectivity of greater than 50% and can reflect beams of 200 to 400 nm with a reflectivity of greater than or equal to 80%. Thus, according to this embodiment, it is possible for ultraviolet components of the ultraviolet light source 1 alone to be allowed to enter the flow cell 7 with high efficiency. To state it in an extreme manner, it is possible for ultraviolet beams alone to be reflected. Meanwhile, emission lines (486 nm and 656.1 nm) of visible components pass through the dichroic mirror surface.

Similarly, light source beams emitted from the visible light source 2 pass through the optical element 3 and are allowed to enter the flow cell 7 using the converging mirror 6. In this embodiment, a metal film is deposited on the opposite side of the dichroic mirror surface in order to limit the amount of light of beams from the visible light source 2 to a certain extent and keep a balance between visible beams and ultraviolet beams.

The amount of light of visible beams can be increased by increasing the transmittance of the optical element 3 with respect to visible beams. In addition, emission line components in the visible range from the ultraviolet light source 1 that have passed through the dichroic mirror surface are reflected by the surface of the metal film and then are allowed to enter the flow cell 7. The emission line components are used for wavelength calibration after the analysis (calibration of the detector).

Figure 3:
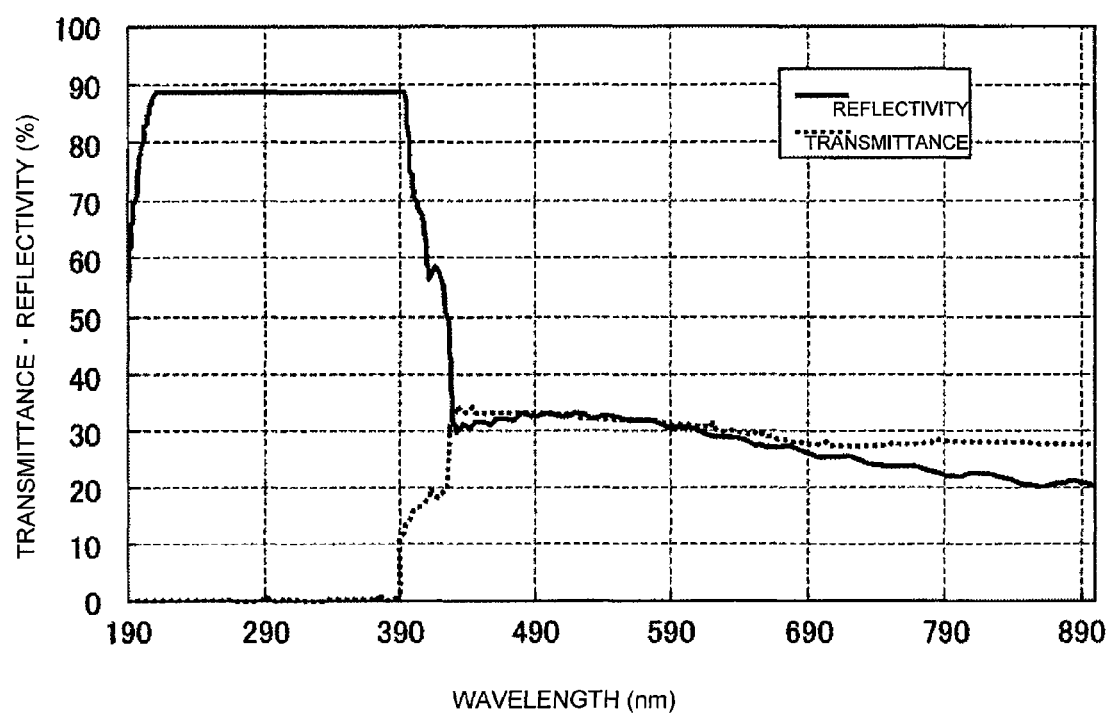
FIG. 3 is a chart illustrating the characteristics of a diachronic element according to an embodiment of the present invention.

FIG. 3 illustrates the characteristics of the optical element of this embodiment. The dichroic mirror surface for reflecting ultraviolet beams has a characteristic of high reflectivity. Specifically, it has a reflectivity of greater than 50% with respect to the wavelength range of 190 to 200 nm and has a reflectivity of greater than or equal to 80% with respect to the wavelength range of 200 to 400 nm. In addition, the metal film that controls the amount of light of visible beams has a transmittance of 20 to 35% with respect to visible beams. Thus, it can use the amount of light of beams more effectively than conventional optics with a half mirror that reflects visible beams (a reflectivity of about several %). The reflectivity of the metal film is also about 30%. Thus, the metal film can allow emission lines from the ultraviolet light source 1 to enter the flow cell 7.

Figure 4:
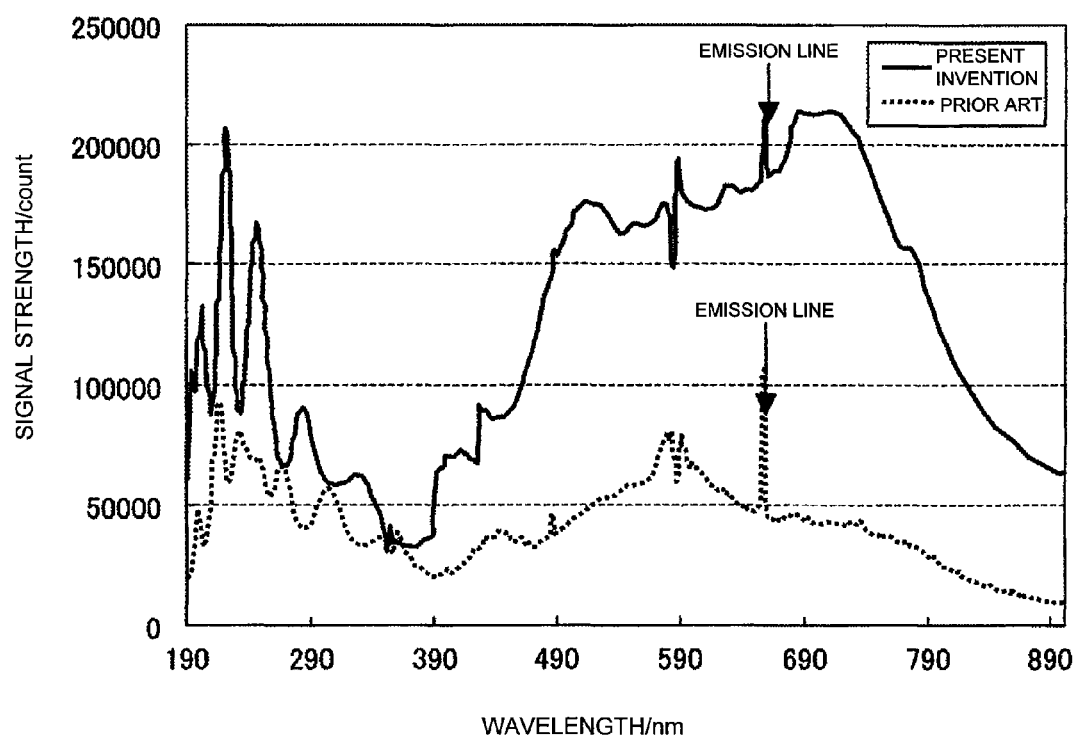
FIG. 4 is a chart illustrating the spectrum characteristics of beams that enter a sample cell according to an embodiment of the present invention.

FIG. 4 illustrates the spectrum characteristics of the beams that enter a sample cell, which are obtained according to the present invention. Referring to a spectrum obtained with a conventional spectrophotometer, there is a possibility that when the amount of light of beams in the entire range from the ultraviolet to visible regions is increased, emission lines could saturate the detector, whereas, with the optics of the present invention, adverse effects of emission lines can be reduced and the amount of light of beams in the entire range from the ultraviolet to visible regions can be increased without causing emission line saturation.

The optics according to the embodiment of the present invention can obtain an amount of light of beams several times that of conventional optics. Therefore, even when the amount of light of beams decreases upon measurement or high-speed measurement of a trace sample, sensitivity that is about equal to the sensitivity of conventional optics can be obtained.

Since a sufficient amount of light of visible beams is obtained, it is possible to lower the input power of the visible light source 2 (for example, a halogen lamp) to reduce the amount of light of beams emitted therefrom. Accordingly, the lifetime of the halogen lamp can be significantly increased. A halogen lamp could be a cause of stray light in the ultraviolet region. When there is much stray light, the linearity of the absorbance of an analyte with respect to ultraviolet beams could be lost. According to the embodiment of the present invention, when measurement is to be conducted in which linearity of absorbance of an analyte with respect to ultraviolet beams is required, analysis with high linearity becomes possible by reducing the amount of light of beams emitted from the halogen lamp.

Figure 5A:
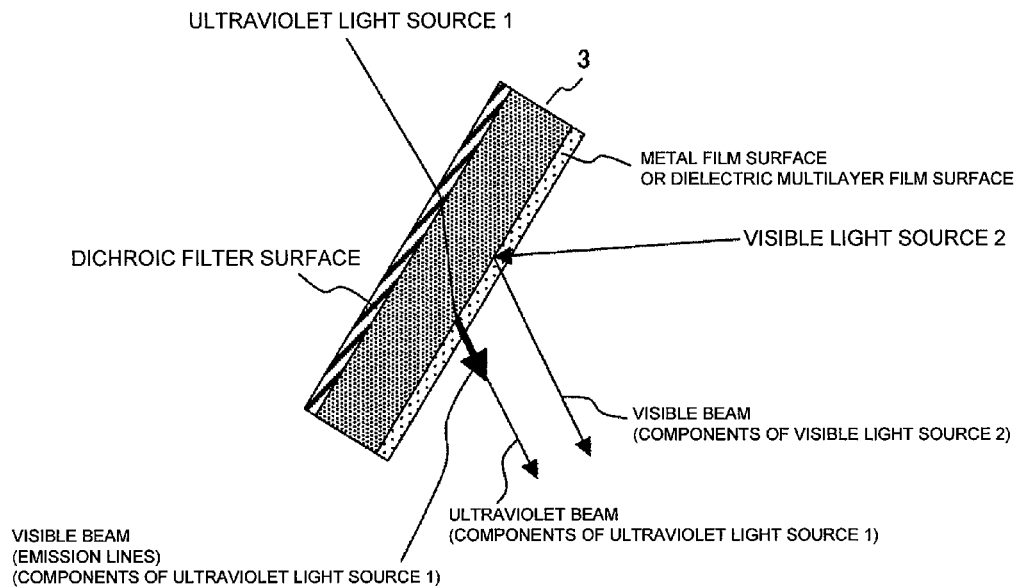
FIG. 5A is a schematic diagram illustrating the relationship between a light source section of a spectrophotometer and a dichroic element according to an embodiment of the present invention.
Figure 5B:
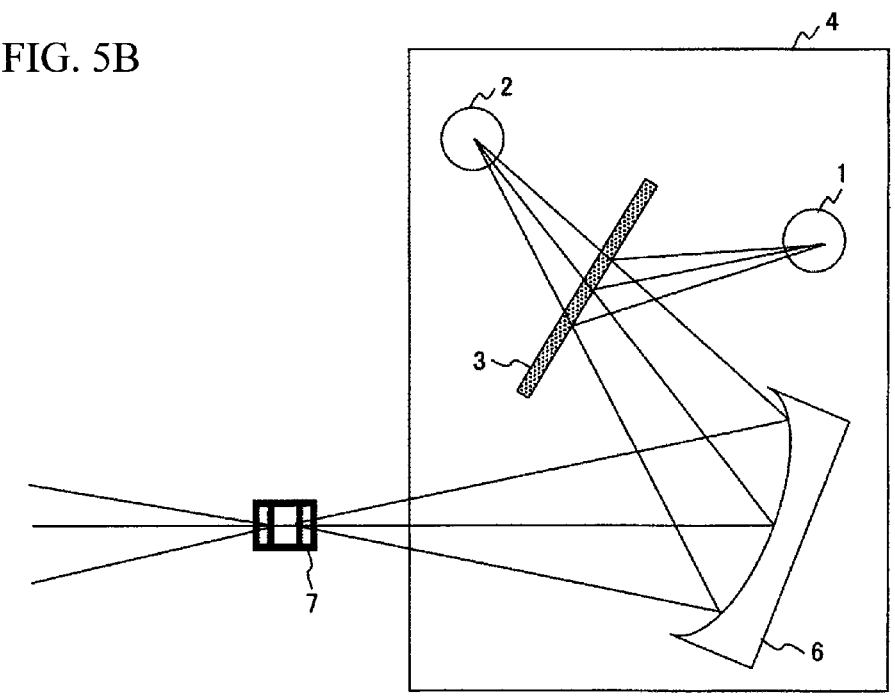
FIG. 5B is a schematic diagram of optics.
Figure 6:
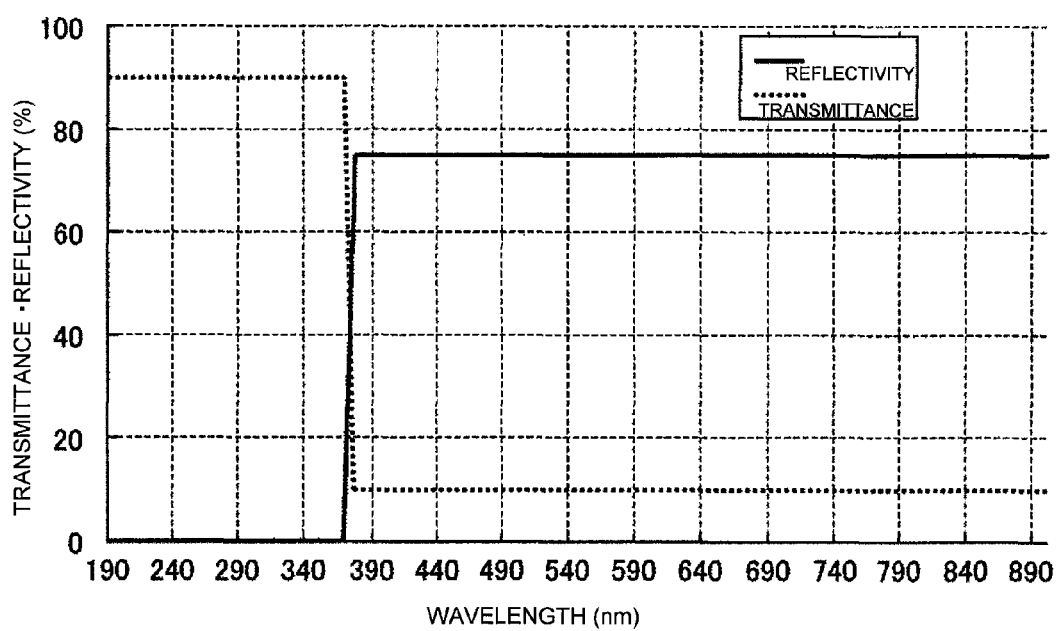
FIG. 6 is a chart illustrating the characteristics of a diachronic element according to another embodiment of the present invention.

Next, another embodiment will be described with reference to FIGS. 5A and 5B. FIGS. 5A and 5B illustrate an example in which the present invention is applied to a conventionally commonly used optical element, which transmits beams from an ultraviolet light source and reflects beams from a visible light source. A dichroic mirror, which transmits ultraviolet beams but does not transmit visible beams, is used for the dichroic element 3. FIG. 6 illustrates the characteristics of the dichroic element used in FIGS. 5A and 5B. Optics that can minimize the amount of emission lines can be configured by making the dichroic element transmit only ultraviolet beams from the ultraviolet light source 1 at a high transmittance of greater than or equal to 80% while making the dichroic element transmit visible components of the ultraviolet light source 1 at a low transmittance of less than or equal to 10%. In addition, the dichroic element reflects beams from the visible light source 2 at a high reflectivity of greater than or equal to 70%; therefore, a sufficient amount of light of visible beams can be obtained. Accordingly, adverse effects of emission lines can be suppressed and the amount of light of beams in a wide range from the ultraviolet to visible regions can be increased.

According to this embodiment, the amount of light of ultraviolet beams can be increased while minimizing adverse effects of emission lines from an ultraviolet light source (for example, a deuterium lamp). In addition, since beams from a visible light source (for example, a halogen lamp) are made to pass through an optical element, the transmittance of the optical element can be easily changed and thus the amount of light of visible beams can be increased. Accordingly, the amount of light of beams in the ultraviolet to visible ranges that enter a sample cell can be increased, and thus, a spectrophotometer with high sensitivity can be provided at low cost without using special optical elements.

What is claimed is:

1. A spectrophotometer comprising:
a sample cell which stores a sample to be measured;
a visible light source and an ultraviolet light source each for supplying an incident beam that enters the sample;
a spectroscope which disperses a beam that has passed through the sample;
an optical detector which detects beams dispersed from such beam; and
a dichroic element which reflects or transmits ultraviolet beams from the ultraviolet light source and which transmits or reflects visible beams from the visible light source, wherein:
optics are configured such that ultraviolet beams and visible beams that have passed through or have been reflected by the dichroic element enter the sample cell,
the dichroic element has a first film formed over one of its surfaces and a second film formed over the other surface,
the first film reflects ultraviolet beams incident on the element and transmits visible beams, and
the second film transmits visible beams.

2. A spectrophotometer comprising:
a sample cell which stores a sample to be measured;
a visible light source and an ultraviolet light source each for supplying an incident beam that enters the sample;
a spectroscope which disperses a beam that has passed through the sample;
an optical detector which detects beams dispersed from such beam; and
a dichroic element which reflects or transmits ultraviolet beams from the ultraviolet light source and which transmits or reflects visible beams from the visible light source, wherein:
optics are configured such that ultraviolet beams and visible beams that have passed through or have been reflected by the dichroic element enter the sample cell,
the dichroic element has a first film formed over one of its surfaces and a second film formed over the other surface,
the first film reflects visible beams incident on the element, and
the second film transmits ultraviolet beams.

3. A spectrophotometer comprising:
a sample cell which stores a sample to be measured;
a visible light source and an ultraviolet light source each for supplying an incident beam that enters the sample;
a spectroscope which disperses a beam that has passed through the sample;
an optical detector which detects beams dispersed from such beam; and
a dichroic element which reflects or transmits ultraviolet beams from the ultraviolet light source and which transmits or reflects visible beams from the visible light source, wherein:
optics are configured such that ultraviolet beams and visible beams that have passed through or have been reflected by the dichroic element enter the sample cell,
the dichroic element has a metal film formed over one of its surfaces and a dielectric multilayer film formed over the other surface, wherein the metal film transmits visible beams incident on the element, and
the dielectric multilayer film reflects ultraviolet beams.

4. A spectrophotometer comprising:
a sample cell which stores a sample to be measured;
a visible light source and an ultraviolet light source each for supplying an incident beam that enters the sample;
a spectroscope which disperses a beam that has passed through the sample;
an optical detector which detects beams dispersed from such beam; and
a dichroic element which reflects or transmits ultraviolet beams from the ultraviolet light source and which transmits or reflects visible beams from the visible light source, wherein:
optics are configured such that ultraviolet beams and visible beams that have passed through or have been reflected by the dichroic element enter the sample cell,
the reflectivity of the dichroic element with respect to visible components of the ultraviolet light source is variable.

5. A spectrophotometer comprising:
a sample cell which stores a sample to be measured;
a visible light source and an ultraviolet light source each for supplying an incident beam that enters the sample;
a spectroscope which disperses a beam that has passed through the sample;
an optical detector which detects beams dispersed from such beam; and
a dichroic element which reflects or transmits ultraviolet beams from the ultraviolet light source and which transmits or reflects visible beams from the visible light source, wherein:
optics are configured such that ultraviolet beams and visible beams that have passed through or have been reflected by the dichroic element enter the sample cell,
the transmittance of the dichroic element with respect to visible components of the visible light source is variable.

6. A spectrophotometer comprising:
a sample cell which stores a sample to be measured;
an ultraviolet light source and a visible light source each for supplying an incident beam that enters the sample;
a spectroscope which disperses a beam that has passed through the sample;
an optical detector which detects beams dispersed from such beam; and
a dichroic element,
wherein the dichroic element reflects or transmits ultraviolet beams from the ultraviolet light source and transmits or reflects visible beams from the visible light source, and
wherein optics are configured such that beams from the ultraviolet light source are separated into ultraviolet components and visible components using the dichroic element, and the ultraviolet beams and visible beams that have passed through or have been reflected by the dichroic element enter the sample cell.

7. The spectrophotometer according to claim 6, wherein the dichroic element is a dichroic mirror or a dichroic filter.

8. The spectrophotometer according to claim 6, wherein the dichroic element has a first film formed over one of its surfaces and a second film formed over the other surface, wherein the first film reflects ultraviolet beams incident on the element and transmits visible beams, and the second film transmits visible beams.

9. The spectrophotometer according to claim 6, wherein the dichroic element has a first film formed over one of its surfaces and a second film formed over the other surface, wherein the first film reflects visible beams incident on the element, and the second film transmits ultraviolet beams.

10. The spectrophotometer according to claim 6, wherein the dichroic element has a metal film formed over one of its surfaces and a dielectric multilayer film formed over the other surface, wherein the metal film transmits visible beams incident on the element, and the dielectric multilayer film reflects ultraviolet beams.

11. The spectrophotometer according to claim 6, wherein a dichroic element, which reflects more than 50% of ultraviolet beams from the ultraviolet light source, is used to reflect ultraviolet beams.

12. The spectrophotometer according to claim 7, wherein a dichroic element, which reflects visible components of the ultraviolet light source, is used to reflect visible beams.

13. The spectrophotometer according to claim 7, wherein a dichroic element, which transmits visible beams, is used to align the incident beams along the same axis.

14. The spectrophotometer according to claim 7, wherein a dichroic element, which reflects more than 50% of ultraviolet beams from the ultraviolet light source and which transmits less than 50% of visible beams, is used to reflect ultraviolet beams.

* * * * *